United States Patent [19]

Kundikoff

[11] 4,409,873
[45] Oct. 18, 1983

[54] MODULAR STRAIGHT EDGE

[76] Inventor: Peter Kundikoff, Rte. 1, Box 204, Escondido, Calif. 92025

[21] Appl. No.: 191,913

[22] Filed: Sep. 29, 1980

Related U.S. Application Data

[63] Continuation-in-part of Ser. No. 49,451, Jun. 18, 1979, abandoned, which is a continuation of Ser. No. 850,648, Nov. 11, 1977, abandoned.

[51] Int. Cl.³ .............................................. B27B 9/04
[52] U.S. Cl. ........................................ 83/745; 33/403; 33/482; 403/293; 403/298; 403/359
[58] Field of Search ................................. 83/743–745; 33/403, 430, 443, 447, 482, 483, 174 G; 52/582, 586; 29/432, 451, 453; 24/201 C; 403/293, 298, 358, 359, 340, 364, 407

[56] References Cited

U.S. PATENT DOCUMENTS

| | | | |
|---|---|---|---|
| 1,087,969 | 2/1914 | Murray et al. | 52/582 |
| 1,655,766 | 1/1928 | Hildebrant | 403/340 |
| 2,791,807 | 5/1957 | Morin | 403/340 X |
| 3,011,530 | 12/1961 | Lamb | 83/745 |
| 3,731,445 | 5/1973 | Hoffman | 52/582 X |
| 3,915,045 | 10/1975 | Kitzman | 83/745 |
| 4,115,902 | 9/1978 | Taylor | 403/364 X |

Primary Examiner—James M. Meister
Attorney, Agent, or Firm—Duane C. Bowen

[57] ABSTRACT

A plurality of straight-edge sections may be joined together by connector pieces. The connector pieces and straight-edge sections incorporate cooperating ribs and channels. The connector piece incorporates ribs with provision for flexing. When the connector pieces forced into the straight-edge sections a wedging jamming relationship is established that holds the straight end sections in aligned relationship. The undersurface of the straight-edge sections incorporates parallel slots which cooperate with rails on a taping flange. The entire assembly may be positioned on the workpiece by the use of the plurality of taping flanges secured to the work surface by adhesive tape.

5 Claims, 4 Drawing Figures

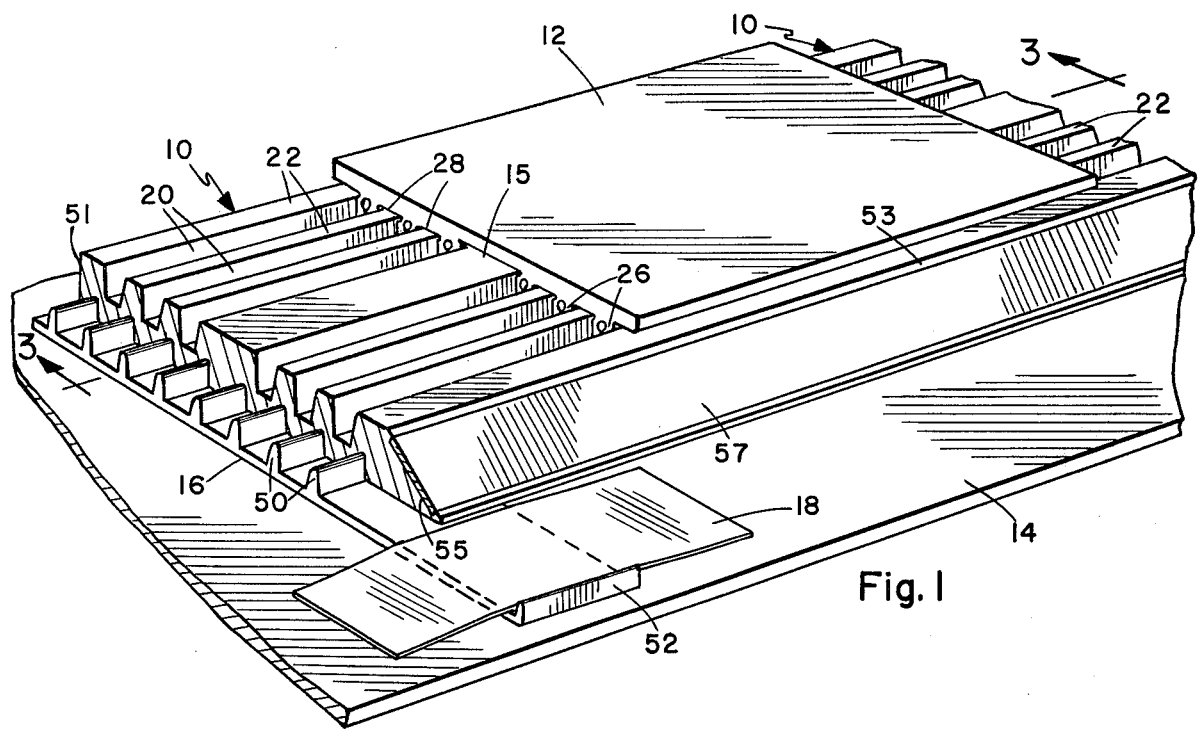
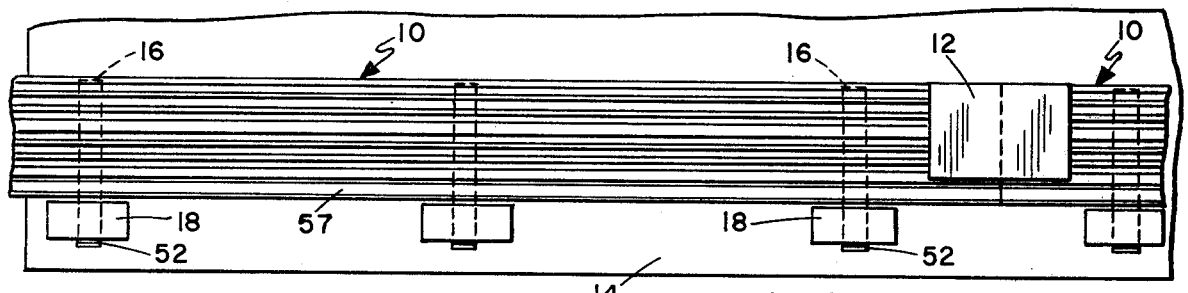
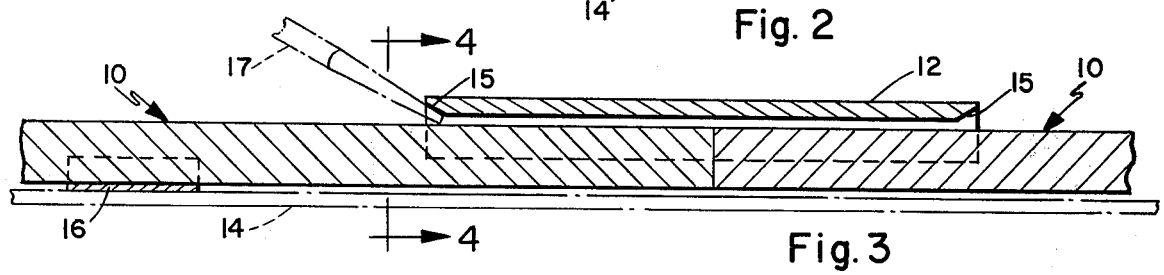
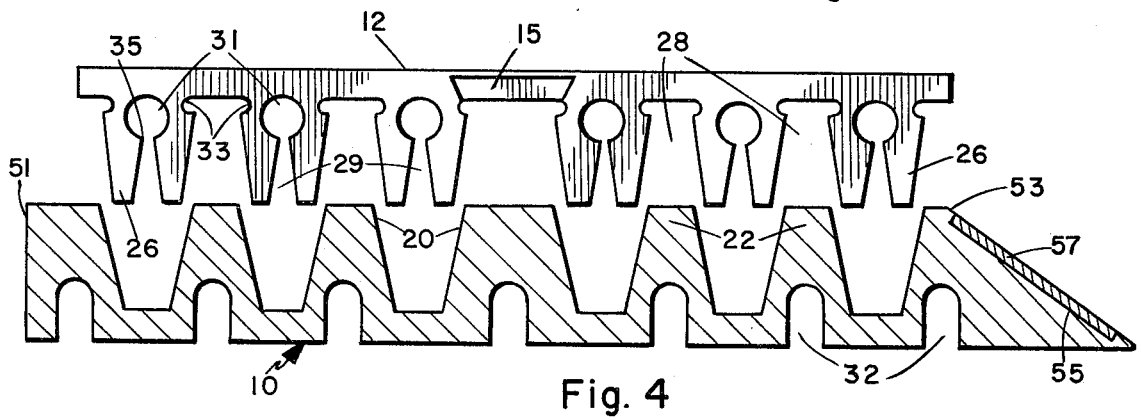

MODULAR STRAIGHT EDGE

RELATION TO OTHER APPLICATION

This application is a continuation-in-part of the patent application for "Straight-Edge System," Ser. No. 049,451, filed June 18, 1979, now abandoned, which was in turn a continuation of a patent application by the same title, Ser. No. 850,648 filed Nov. 11, 1977, now abandoned.

BACKGROUND OF THE DISCLOSURE

In the construction trades, particularly carpentry, straight-edges are used extensively to mark the location for a cut or other operation to be performed on a work surface. It has been recognized that in many applications, it is advantageous to use the straight-edge on the surface as a guide for the saw or other tools. When such a straight edge is used to guide a power saw, for example, it is necessary that the straight-edge be held in position on the workpiece.

For smaller straight-edges, it may be possible to hold the straight edge by hand without any additional securing device. Applicant's co-pending application Ser. No. 803,616 entitled "Cutting Guide" describes the square with a straight-guiding edge held in position by hand on smaller work stock.

Applicant's U.S. Pat. No. 4,028,976 issued June 14, 1977 entitled "Cutting Tool Guiding System" illustrates the use of pin for fixedly securing the straight-edge to the workpiece during saw guiding operation. It will be appreciated that straight-edges held in place manually are limited in size by the maximum size an individual can easily hold in position by hand. Pinned straight-edges are limited in size by the size a workman can easily carry from job to job and site to site.

There is no prior art device that makes it possible to guide a portable tool such as a circular saw in making cut of extended length. Also there is no prior structure which makes it possible to secure extended length straight edges on surfaces which would be damaged by or which will not permit the penetration of pins as a means for holding the straight-edge in place.

Therefore, it is desirable to have a straight-edge system which may be secured to the surface of a workpiece and provide an extended guiding edge, and which may be broken down into a convenient size for carrying and storage. Such a device is particularly desirable where several sections of the device may be fastened together without elaborate mechanical fasteners and where the setup and breakdown of the system is easily accomplished.

SUMMARY OF THE INVENTION

In an exemplary embodiment of the invention, straight-edge sections are joined together in end-to-end relationship to provide extended straight guiding edges. The straight-edge section may be held in position on the surface of the workpiece utilizing a tape securing structure.

Several straight-edge sections may be assembled to one another utilizing a connector piece. Cooperating channels and ribs on the upper surface of the straight-edge section and the downward facing surface of the connector piece are engaged to produce the necessary interconnection for alignment and the transfer of forces from one section to the next. The sidewalls of the channels and ribs are at an angle that produces a jamming fit so that the connector and straight-edge sections are self-clamping and may be assembled with normal hand pressure.

The ribs may be slotted so that very little force is necessary to insert the ribs into the channels despite initial misalignment of the surfaces caused by manufacturing tolerance. As full insertion takes place, the surface of the slotted ribs come into contact with the surface of the channels to produce substantial friction force. The maximum amount of force required to compress the rib surfaces is limited by a relief opening of circular cross-section and a pair of relief groves on either side of the rib.

When the sections are disassembled, a pry port under the edge of the connector may be utilized to free the connector of the straight-edge sections by using the leverage of and inserted screw driver.

A taping flange is provided which has a series of flange rails protruding from its upper surface. The flange rails correspond in size and spacing to slots in the undersurface of the straight-edge section. Thus when the straight edge section is pressed over the flange rails, a secure structural relationship is obtained between the securing flange and straight-edge sections. An extension of the taping flange extends beyond the straight-edge section to lie on the surface of the workpiece. Magnetic inserts clamping an adhesive systems may be utilized in conjunction with flange to secure the entire assembly in position on the work surface. Tape, such as masking tape, is applied over the taping extension and on to the work surface so that the taping flange and through taping flange, the straight-edge is held securely in position.

The invention provides a new and approved straight-edge system for work surfaces. The straight edge section are relatively low in cost and may be made from a low tolerance manufacturing processes such as aluminum extrusion. The sections maybe carried disassembled maximizing the convenience of their use. Provision is made for securing the straight-sections to the work surface of that hand pressure to hold the straight-edges positions is not necessary. The taping flange permits the system to be secured to the surfaces which cannot withstand penetration. Many other attendant advantages of the invention will become more apparent upon the reading of the following detailed description, together with the drawings in which like reference numeral refer to like parts throughout and in which:

BRIEF DESCRIPTION OF THE DRAWINGS

FIG. 1 is a perspective view of straight-edge sections connected by a connector piece and utilized in association with the taping flange.

FIG. 2 is a top plan view of straight-edge sections held on a surface by the taping flange.

FIG. 3 is a sectional view taken on line 3—3 of FIG. 1.

FIG. 4 is a section view taken on line 4—4 of FIG. 3.

DETAILED DESCRIPTION OF THE DRAWING

Referring now to the drawings, there is illustrated two straight-edge sections 10 arranged in end-to-end abutting relationship on a work surface 14. The straight-edge sections are joined together by a connector piece 12. In the system as assembled in FIG. 1, the straight-edge sections are secured on the surface 14 through the use of the tape securing flange 16, which is itself secured to the surface 14 by a piece of tape 18.

Referring particularly to FIGS. 1 and 4, the structure of the connector piece and its use to hold the straight-edge sections in assembled relationship is illustrated. The straight-edge sections are formed with a series of parallel, aligned and juxtaposed channels 20 which extend the longitudinal length of the elongated section 10. The spaced channels 20 form spaced ribs 22. The undersurface of the connector piece 12 is similarly configured with a plurality of spaced parallel juxtaposed channels 28 separating corresponding ribs 26. However, the ribs 26 have an exterior angle which is closer to straight-sided than the angulated walls of the channels 20. In addition, the ribs 26 have a central slot 29 which opens on to a relief opening 31 which has a circular cross-section. Additional relief openings are provided in the form of relief grooves 33 on either side of the ribs 26 at their base. The ribs and channels on the connector piece 12 and sections 10 are spaced to produce a mating relationship. The angle made by the walls of the channels 20, to a line normal to the planar surface of the straight-edge sections is selected to produce a jamming fit in the materials utilized. The angular relationship that produces a jamming fit in plastic materials ranges from 3 to 15 degrees. Where aluminum is employed the angular range for a jamming fit, that is at the same time self-clamping (the section must be pried apart) is in the range of 3 to 5 degrees. In the preferred embodiment aluminum parts are illustrated and the angle of the walls 20 is about 5 degrees from the vertical. The corresponding ridges 26 on the connector piece 12, are at an angle approximately 1 or 2 degrees less than the walls 20. The nominal 1 or 2 degree difference allows for manufacturing tolerance and variations such as are commonly experienced in aluminum extrusions. The differential insures that wall to wall contact will be made over substantially the entire height of the channels and the ribs. The angular differential is accomodated by the use of a slotted construction for the ribs. The slots 29 open on to circular relief holes 31. Compression of the ribs to conform to the angle of the channels takes place easily due to the slotted and relieved construction. However, when the rib nears full insertion, contact is made at the mating point 35 between the slots and circular relief holes. Thereafter, the compression is substantially stiffened with most of the tolerance for further compression being provided by the compression of the holes 31 themselves and the additional relief provided by the relief grooves 33.

As an aid in disassembling the connector piece from the straight-edge sections, a pry port 15 is provided. A screw driver, such as illustrated by dotted lines at 17, may be utilized in the pry port 15 to provide the workman with additional leverage in disassembling the connector piece from the straight-edge sections.

The securing flange 16 provides for positioning of the straight-edge sections on impervious surfaces or those which would be damaged by nailing or other penetration. The securing flange 16 incorporates a plurality of flange rails 50 protruding from the upper surface of the flange 16. Flange rails 50 mate with corresponding securing slots 32 in the undersurface of the straight-edge sections 10. Thus when a straight-edge section 10 is pressed over the securing flange 16, a strong structural interconnection between the straight-edge section in securing flange is obtained. When in secured position the extension 52 of the securing flange 16, extends beyond the confines of the straight-edge section 10. Thus the workman will arrange to position the securing flange so that the taping extension used on the side of the work opposite from that on which guiding of a tool is to be accomplished. A piece of tape 18 is adhesively secured to work surface 14 and over the taping extension 52 so that the entire assembly is held in position on the work surface 14. Since the primary function of the securing flange 16 is to position the straight-edge on the plane of the workpiece, it is not necessary, in the usual environment to provide a gripping, interfitting relationship, but it should be understood that such structure is within the scope of the invention.

The straight-edge sections have a vertical guiding edge 51 along one side thereof and a sloping guiding edge 53 along the opposite edge. The sloping guiding edge 53 incorporates a longitudinal recess 55 within which a ruler 57 is mounted. Thus the ruler 57 is protected from damage and yet is accessible for measurement made along the sloping guiding edge 53 of the straight-edge. The sloping guiding edge 53 is normally preferred with the use of hand tools such as where a workman needs to make a long straight scratch in the surface of the workpiece. The sloping surface permits the workman to rest the fingers of the hand that grasp the cutting tool on the sloping edge and thereby maintain the cutting edge directly in contact with the outermost part of the straight-edge.

While the preferred embodiment has been described with the slotted and relieved ribs located on the connector piece, it will be understood that the slotted and relieved ribs can alternatively, or in addition, be located on the straight-edge sections 10.

Having described to invention, I now claim:

1. A modular straight-edge comprising:
   - at least one elongated straight-edge section having a work surface engaging portion and at least one longitudinal straight guiding edge,
   - said work surface engaging portion of said straight edge section having a plurality of securing slots,
   - a securing flange mounting a plurality of securing rails,
   - said rails being sized, spaced, and oriented to be received in and to engage said securing slots,
   - said securing flange further including an extension for extending beyond said straight-edge sections and for being secured to a work surface.

2. The modular straight-edge according to claim 1 wherein:
   - said extension comprising a taping extension for receiving adhesive tape passing over said taping extension and onto said work surface.

3. The straight-edge system according to claim 2 wherein:
   - said rails and slots are generally straight walled.

4. A modular straight edge as described in claim 1 with at least one elongated straight edge section contains a plurality of ribs which are relieved by openings of substantially circular cross section connected to said securing slot.

5. A modular straight edge according to claim 1 wherein at least one of the longitudinals of said straight edge sections has a sloping guide edge which incorporates a longitudinal recess, a ruler received in said longitudinal recess.

* * * * *